(12) United States Patent
Kamada

(10) Patent No.: US 8,556,445 B2
(45) Date of Patent: Oct. 15, 2013

(54) LIGHTING DEVICE, DISPLAY DEVICE AND TELEVISION DEVICE

(75) Inventor: Kentaro Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/695,850

(22) PCT Filed: Apr. 15, 2011

(86) PCT No.: PCT/JP2011/059359
§ 371 (c)(1),
(2), (4) Date: Nov. 2, 2012

(87) PCT Pub. No.: WO2011/152133
PCT Pub. Date: Dec. 8, 2011

(65) Prior Publication Data
US 2013/0050588 A1 Feb. 28, 2013

(30) Foreign Application Priority Data
Jun. 2, 2010 (JP) ................................ 2010-126947

(51) Int. Cl.
*G02F 1/13357* (2006.01)
*G09F 13/14* (2006.01)
(52) U.S. Cl.
USPC .............. 362/97.3; 362/97.1; 349/67; 349/62
(58) Field of Classification Search
USPC ............................. 362/97.1–97.4; 349/61–71
See application file for complete search history.

(56) References Cited

U.S. PATENT DOCUMENTS

| | | | |
|---|---|---|---|
| 2012/0099026 A1* | 4/2012 | Yokota | 349/62 |
| 2012/0105764 A1* | 5/2012 | Yokota | 362/97.1 |
| 2012/0327311 A1* | 12/2012 | Kuromizu | 362/97.2 |
| 2013/0128128 A1* | 5/2013 | Ikuta | 362/97.1 |

FOREIGN PATENT DOCUMENTS

JP 2010-15853 A 1/2010

OTHER PUBLICATIONS

Official Communication issued in International Patent Application No. PCT/JP2011/059359, mailed on Jul. 26, 2011.

* cited by examiner

*Primary Examiner* — Mariceli Santiago
(74) *Attorney, Agent, or Firm* — Keating & Bennett, LLP

(57) ABSTRACT

A technology for restricting or suppressing a lift of a reflection sheet in a direct backlight device is provided. The direct backlight device according to the present invention includes an LED board 30, LEDs 28, lenses 32, legs 31a, 31b and 31c, a reflection sheet 26. The LEDs 28 are arranged on a surface of the LED board 30. The lenses 32 cover the respective LEDs 28 from the light exit side and diffuse light from the LEDs 28. The legs 31a, 31b and 31c are arranged on the surface of the LED board 30 and support the lenses 32. The reflection sheet 26 has through holes 27. The LEDs 28 and the legs 31a, 31b and 31c are passed through the respective through holes 27 of the reflection sheet 26. The reflection sheet 26 includes projections 26a, 26b and 26c projecting inward from an edge of the corresponding through hole 27. The three projections 26a, 26b and 26c are held between the three legs 31a, 31b and 31c.

10 Claims, 9 Drawing Sheets

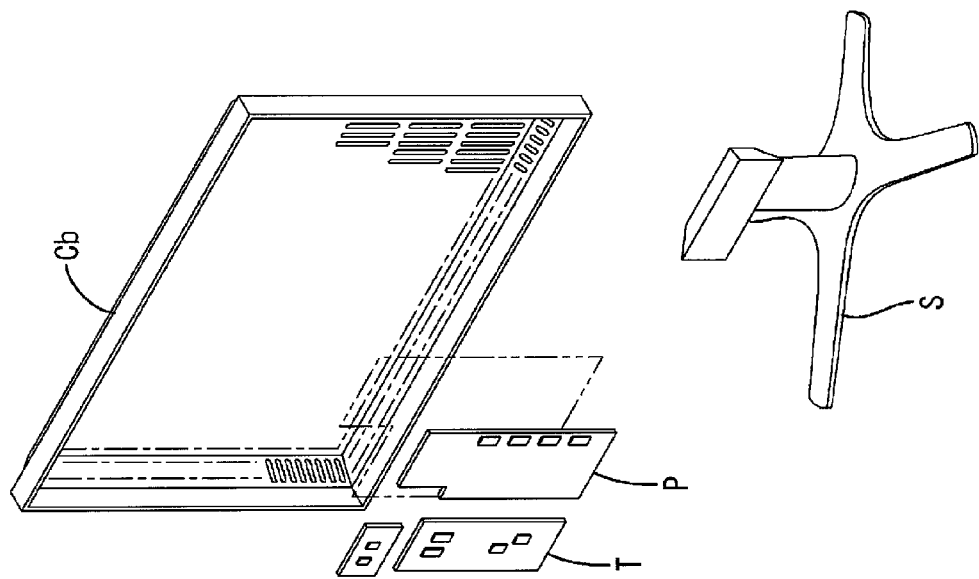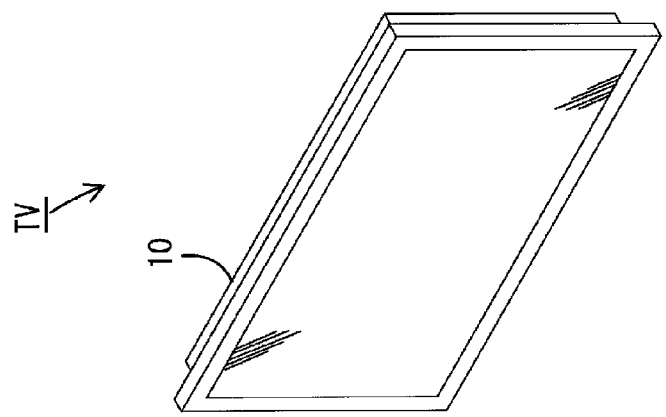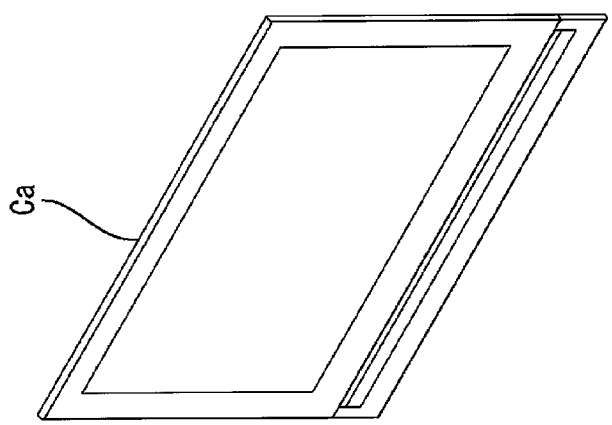
FIG.1

LIGHTING DEVICE, DISPLAY DEVICE AND TELEVISION DEVICE

TECHNICAL FIELD

The present invention relates to a lighting device, a display device and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be decreased. Liquid crystal panels included in the liquid crystal display devices do not emit light, and thus backlight devices are required as separate lighting devices.

A direct backlight device for directly supplying light from to a liquid crystal panel from the back is an example of such a backlight device. In this backlight device, a reflection sheet may be arranged on a light source board on which LEDs or other type of light sources are arranged.

A direct backlight device including a reflection sheet arranged on a light source board on which LED light sources are arranged is disclosed in Patent Document 1.

RELATED ART DOCUMENT

Patent Document

Patent Document 1: Japanese Unexamined Patent Application Publication No. 2010-15853

Problem to be Solved by the Invention

In the backlight device disclosed in Patent Document 1, a part of the reflection sheet may be lifted due to heat generated around the LEDs or displacement of the reflection sheet. If that occurs, light from the LEDs may be blocked by the reflection sheet. As a result, display performance with the backlight device may decrease.

DISCLOSURE OF THE PRESENT INVENTION

The present invention was made in view of the foregoing circumstances. An object of the present invention is to provide a direct lighting device in which a lift of a reflection sheet is hardly or less likely to occur.

Means for Solving the Problem

Technologies described herein are related to a lighting device having the following configurations. The lighting device includes a light source board, a light source, a lens, a plurality of support members, a reflection sheet, and a housing. The light source is arranged on a first main surface of the light source board. The lens is configured to diffuse light from the light source. The lens covers the light source from a light exit side. The support members support the lens. The support members are arranged on the first main surface of the light source board. The reflection sheet has a through hole. The reflection sheet is arranged on the first main surface of the light source board. The housing has a bottom plate opposed to a second main surface of the light source board. The housing holds the light source board, the light source, the lens, the supporting members, and the reflection sheet therein. The light source and the support members are passed through the through hole of the reflection sheet. The reflection sheet includes a projection that projects inward from an edge of the through hole. The projection is held between the support members.

In the lighting device, the projections are held between the support members and tightly caught between the light source board and the lens. Therefore, the lift of the reflection sheet can be restricted or suppressed.

Another aspect of the technologies described herein relates to a lighting device having the following configuration. The lighting device includes a light source board, a light source, a plurality of support members, reflection sheet, and a housing. The light source is arranged on a first main surface of the light source board. The support members support the light source. The support members are arranged on the first main surface of the light source board. The reflection sheet has a through hole. The reflection sheet is arranged on the first main surface of the light source board. The housing has a bottom plate opposed to a second main surface of the light source board. The housing holds the light source board, the light source, the supporting members, and the reflection sheet therein. The light source and the support members are passed through the through hole of the reflection sheet. The reflection sheet includes a projection that projects inward from an edge of the through hole. The projection is held between the support members.

In the above lighting device, the projection is held between the support members and caught between the light source board and the light source. Therefore, the lift of the reflection sheet can be restricted or suppressed.

The projection may include a plurality of projections in the through hole.

With this configuration, that is, the plurality of projections held between the support members, the left of the reflection sheet is effectively restricted or suppressed.

The projections may have the same shape and the same size. The projections may be arranged at equal intervals. The projections may be arranged such that distal ends thereof are at equal distance from a center of the lens or the light source.

With this configuration, when the projections are caught between the light source board and the lens or the light source, loads applied to the projections can be equalized. Therefore, the lift of the reflection sheet can be effectively restricted or suppressed.

A distal end of the projection may be bent toward an opposite direction to the light source board and held between the support members while being in contact with the lens or the light source.

With this configuration, the distal end of the projection is curved toward the opposite direction to the light source board and brought into contact with the light source or the lens. As a result, the distal end of the projection is held between the light source board and the light source or the lens. With this configuration, the lift of the reflection sheet can be effectively restricted or suppressed.

The technologies described herein may be applied to a display device including a display panel configured to provide display using light from the above lighting device. A display device including a liquid crystal panel using liquid crystals as the above-described display panel is also new and useful. A television device including such a display device is also new and useful. According to the display device and the television device, a size of display area can be increased.

Advantageous Effect of the Invention

According to the technologies described herein, a direct lighting device is provided with a technology for restricting or suppressing the lift of the reflection sheet.

BRIEF DESCRIPTION OF THE DRAWINGS

FIG. 1 is an exploded perspective view of a television device TV according to a first embodiment.

MODE FOR CARRYING OUT THE INVENTION

First Embodiment

A first embodiment will be explained with reference to drawings. X-axes, Y-axes and Z-axes are indicated in some drawings. The axes in each drawing correspond to the respective axes in other drawings. The X-axes and Y-axes are aligned with the horizontal direction and the vertical direction, respectively.

FIG. 1 is an exploded perspective view of a television device TV according to the first embodiment. As illustrated in FIG. 1, the television device TV includes the liquid crystal display device 10, front and rear cabinets Ca, Cb that hold the liquid crystal display device 10 therebetween, a power source P, a tuner T, and a stand S. An overall shape of the liquid crystal display device (a display device) 10 is a landscape rectangular. The liquid crystal display device 10 is held in a vertical position.

Figure 2:
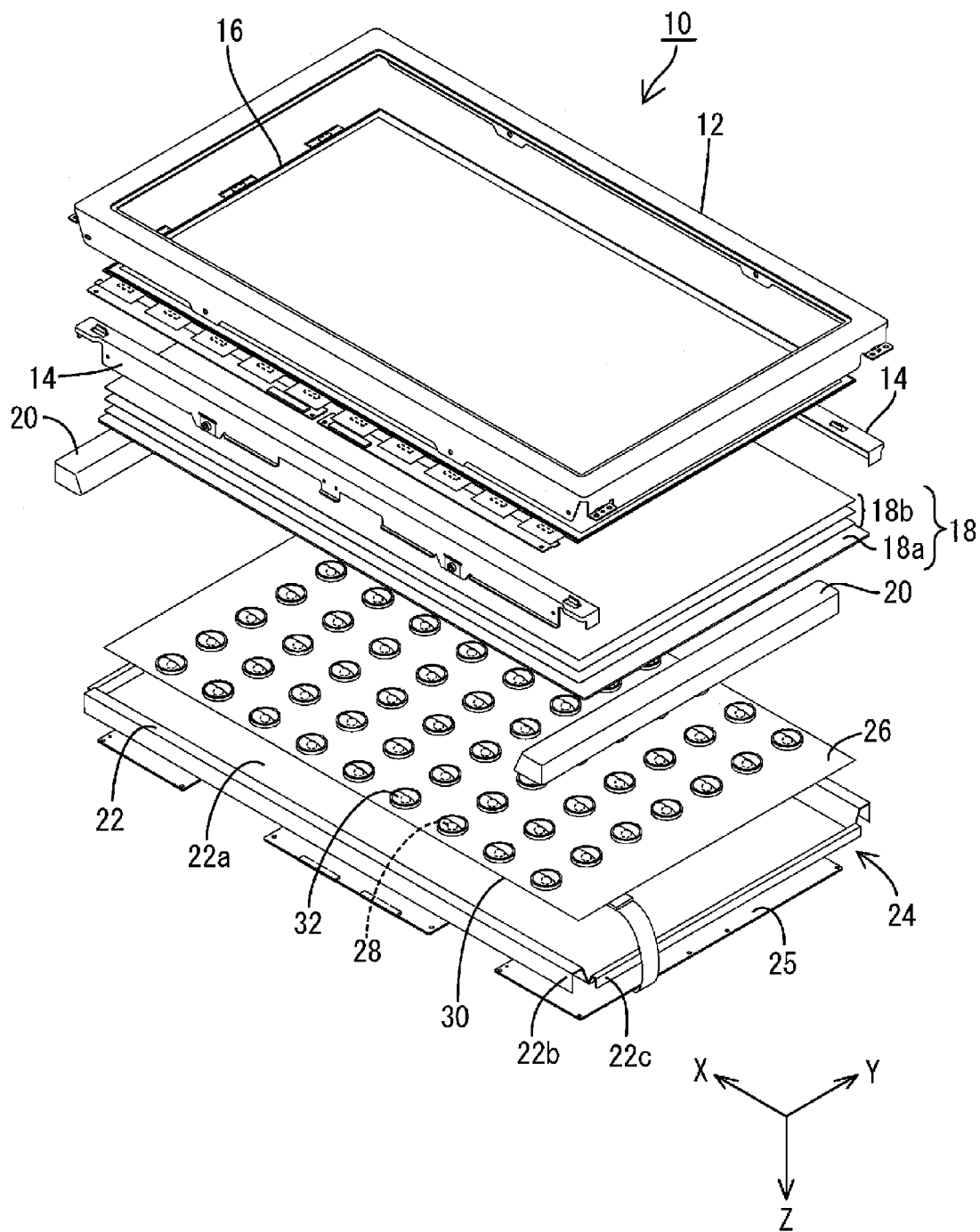
FIG. 2 is an exploded perspective view of a liquid crystal display device 10.
Figure 3:
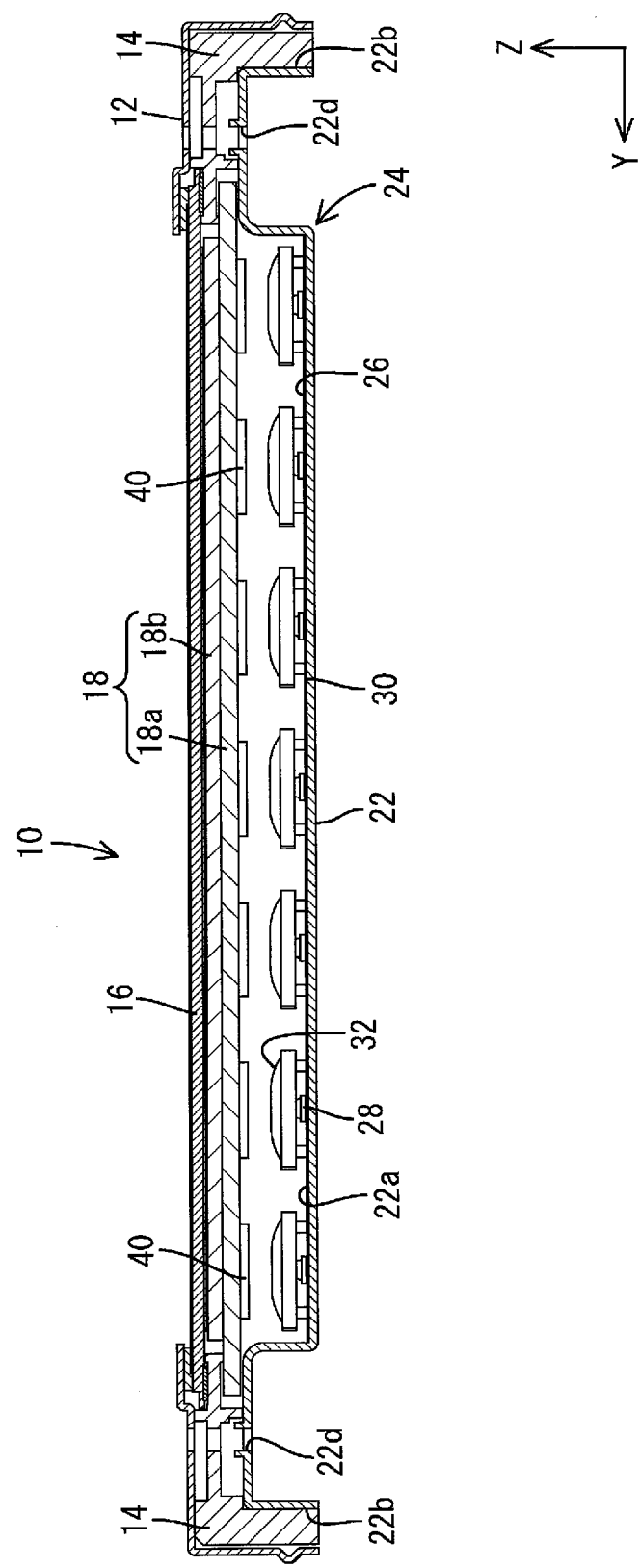
FIG. 3 is a cross-sectional view of the liquid crystal display device 10.

FIG. 2 is an exploded perspective view of the liquid crystal display device 10. FIG. 3 is a cross-sectional view of the liquid display device 10 along the vertical direction. In FIGS. 2 and 3, the upper side and the lower side correspond to the front side and the rear side of the liquid crystal display device 10, respectively. As illustrated in FIG. 2, the liquid crystal display device 10 includes a liquid crystal panel 16 and a backlight unit 24. The liquid crystal panel 16 is a display panel and the backlight unit 24 is an external light source. The liquid crystal panel 16 and the backlight unit 24 are integrally held with a bezel 12 having a frame-like shape.

Next, the liquid crystal panel 16 and the backlight unit 24 included in the liquid crystal display device 10 will be explained. The liquid crystal panel 16 includes a pair of transparent glass substrates (having a high light transmission capability) and a liquid crystal layer (not illustrated). The glass substrates are bonded together with a predetermined gap therebetween. The liquid crystal layer is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Image data and various control signals are transmitted from a driver circuit board (not illustrated) to the source lines, the gate lines, and the counter electrodes for displaying images. Polarizing plates (not illustrated) are attached to outer surfaces of the glass substrates.

As illustrated in FIG. 2, the backlight unit 24 includes a backlight chassis 22, optical members 18 (a diffuser plate 18a and a plurality of optical sheets 18b arranged on the front side of the diffuser plate 18a), and frames 14. The backlight chassis 22 has a box-like shape and an opening on the front side (the light emitting side or the liquid crystal panel 16 side). The optical members 18 are arranged on the front side of the backlight chassis 22 so as to cover the opening of the backlight chassis 22. The frames 14 are arranged along the long sides of the backlight chassis 22. The long edges of the optical members 18 are sandwiched between the backlight chassis 22 and the frames 14.

LEDs (light emitting diodes) 28, an LED board 30 on which the LEDs 28 are mounted, and outer edge members 20 are held in the backlight chassis 22. The outer edge members 20 are arranged at the respective short edges of the backlight chassis 22. The outer edge members 20 direct light from the LEDs 28 inward. In the backlight unit 24, a side closer to the diffuser plate 18a than the LED board 30 is a light exit side. The backlight unit 24 is a direct backlight device configured to illuminate the liquid crystal panel 16 from the back via the diffuser plate 18a.

The backlight chassis 22 is made of metal, for instance, aluminum-based material. The backlight chassis 22 is formed in a shallow box-like shape by sheet metal processing. The backlight chassis 22 includes a bottom plate 22a, long edge portions 22b, and short edge portions 22c. The long edge portions 22b rise from the respective long edges of the bottom plate 22a. Each long edge portion 22b is folded into a substantially U-shape. The short edge portions 22c rise from the respective short edges of the bottom plate 22a. Each short edge portion 22c is folded into a substantially U-shape. As illustrated in FIG. 3, fixing holes 22d are provided in the long edge portions 22b of the backlight chassis 22. With the fixing holes 22d, the bezel 12, the frames 14, and the backlight chassis 22 are fixed together.

The LED board 20 made of resin is placed on the front surface of the bottom plate 22a of the backlight chassis 22. The LEDs 28 and lenses 32 are arranged on the front surface of the LED board 30. The LEDs 28 are arranged in arrays. The lenses 32 are arranged so as to cover the respective LEDs 28 from the light exit side. The reflection sheet 26 has through holes 27 (see FIGS. 4 and 5). The LEDs 28 and the lenses 32 are uncovered and visible from the front side through the through holes 27. A power supply circuit boards 25 are mounted to the rear surface of the bottom plate 22a of the backlight chassis 22 for supplying driving power to the LEDs 28.

Each LED 28 emits white light. The LED 28 includes surface-mounted three kinks of LED chips (not illustrated), for instance, red, green, and blue LED chips. The LED 28 can be configured as one of the followings. The LED 28 may include a blue light emitting element with a phosphor having a light emission peak in a yellow region applied on the blue light emitting element to emit white light. The LED 28 may include a blue light emitting element with a phosphor having a light emission peak in a green region and a phosphor having a light emission peak in a red region applied on the blue light emitting element to emit white light. The LED 28 may include a blue light emitting element with a phosphor having alight emission peak in a green region applied on the blue light emitting element, and a red light emitting element to emit white light. The LED 28 may include an ultraviolet light emitting element and a phosphor. The LED 28 may include an ultraviolet light emitting element with phosphors having light emissions peaks in the blue region, the green region, and the red region, respectively, applied on the ultraviolet light emitting element.

Each lens 32 is made of transparent material having a refraction index higher than that of air (e.g., acrylic or polycarbonate). The lens 32 has a function of refracting light emitted by the LED 80 to diffuse the light. The lens 32 has a round plan-view shape and the corresponding LED 28 is arranged at the center of the lens 32. Namely, the lens 32 is arranged so as to cover the LED 28 from the front side. The configuration of each lens 32 will be explained in detail later.

The reflection sheet 26 is made of synthetic resin and the surface thereof is white that provides high light reflectivity. The reflection sheet 26 is placed so as to cover about an entire area of the inner surface of the bottom plate 22a of the backlight chassis 22. Light emitted by the LEDs 28 is reflected toward the diffuser plate 18a.

The diffuser plate 18a of the optical members 18 includes a synthetic resin plate with light scattering particles dispersed therein. The diffuser plate 18a has a function of diffusing point light emitted by the LEDs 28, which are point light sources. The diffuser plate 18a also has a light reflection function of reflecting light emitted by the LEDs 28. The optical sheets 18b include a diffuser sheet, a lens sheet, and a reflection-type polarizing plate layered in this sequence from the diffuser plate 18a side on the front side of the diffuser plate 18a. The optical sheets 18b have a function of converting light emitted by the LEDs 28 and passed through the diffuser plate 18a into planer light. The liquid crystal panel 16 is arranged at the front of the optical sheets 18b. The optical sheets 18b are sandwiched between the diffuser plate 18a and the liquid crystal panel 16. A plurality of round light reflectors 40, which are white dot patterns, are provided on the rear surface of the diffuser plate 18a (opposite the LEDs 28). Each light reflector 40 has light reflectivity higher than in-plane light reflectivity of the diffuser plate 18a.

Figure 4:
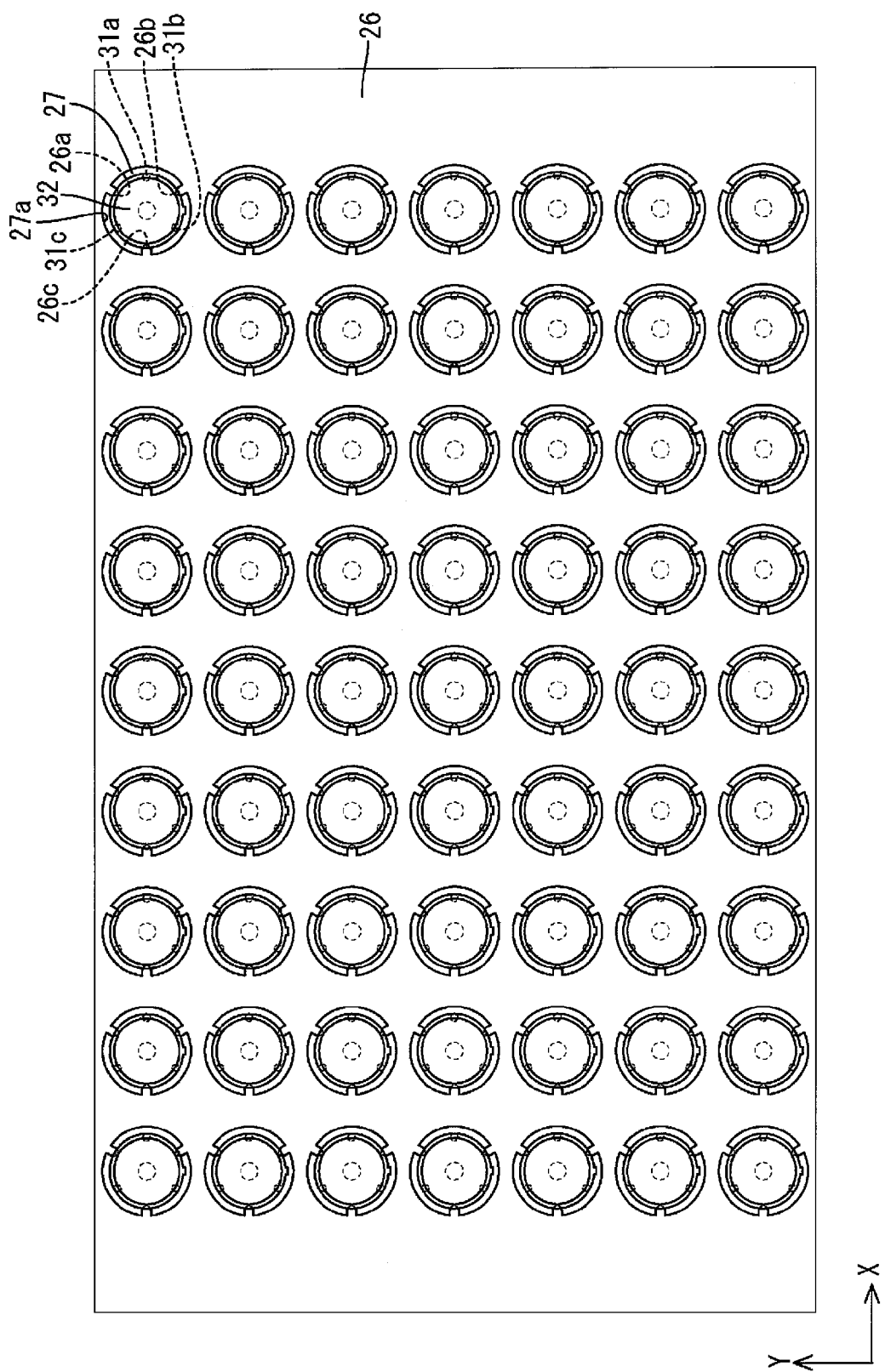
FIG. 4 is a plan view of a reflection sheet 26 and lenses 32.
Figure 5:
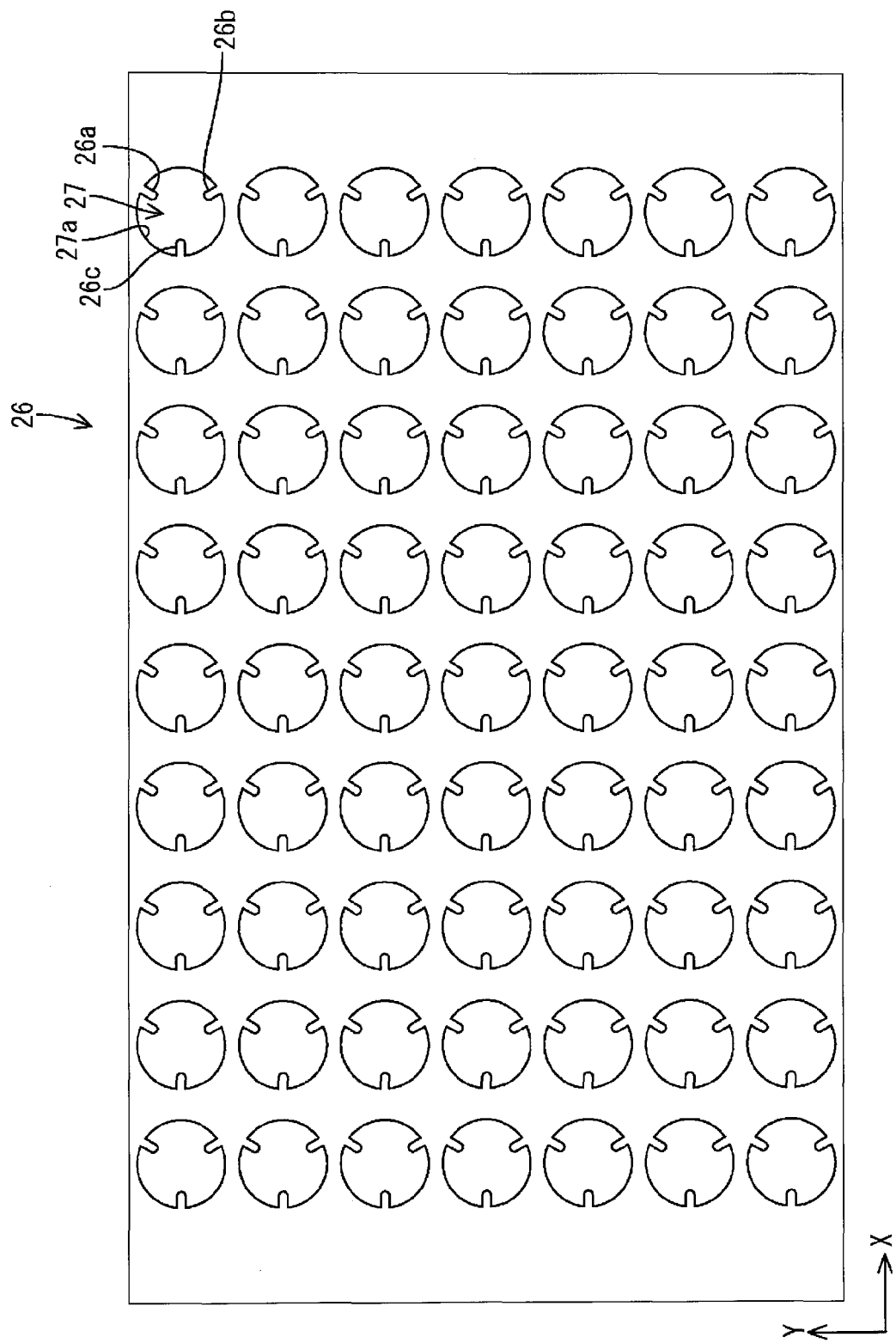
FIG. 5 is a plan view of the reflection sheet 26.
Figure 6:
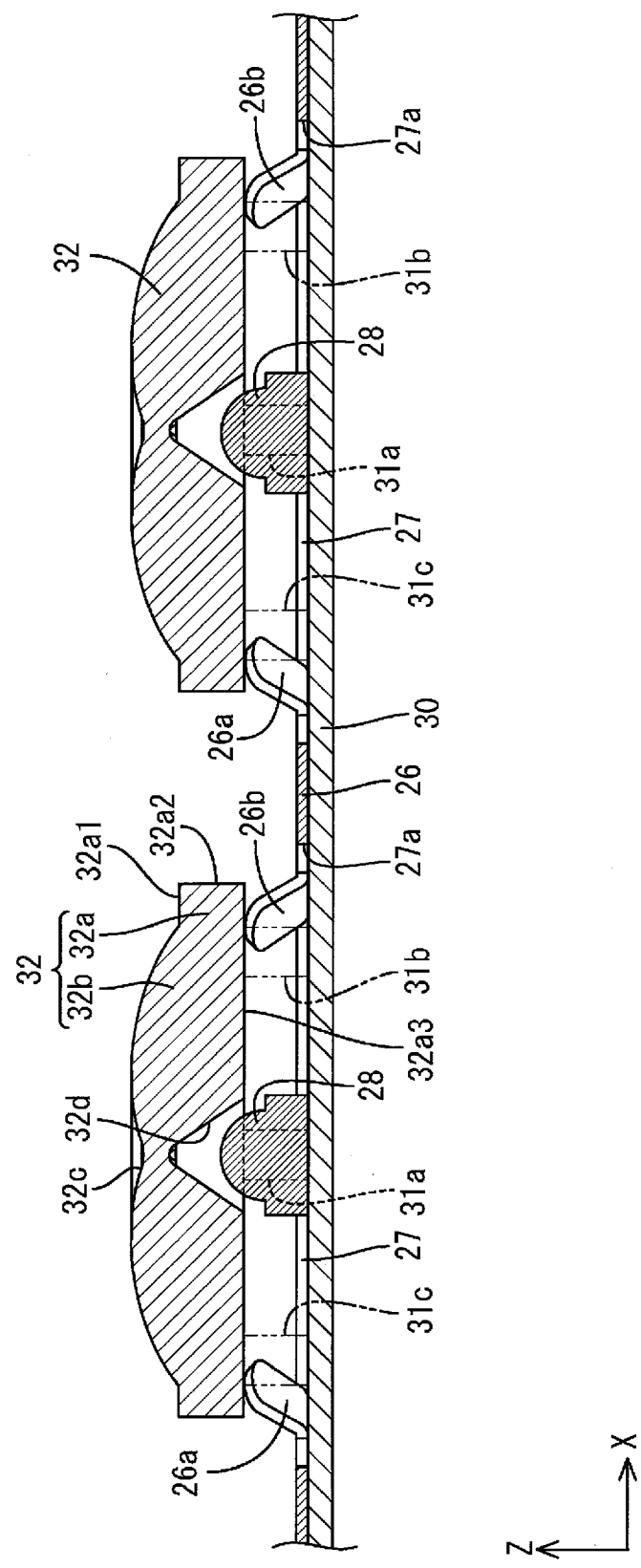
FIG. 6 is a magnified cross-sectional view of the reflection sheet 26 and the lenses 32 arranged on a front side of an LED board 30.
Figure 7:
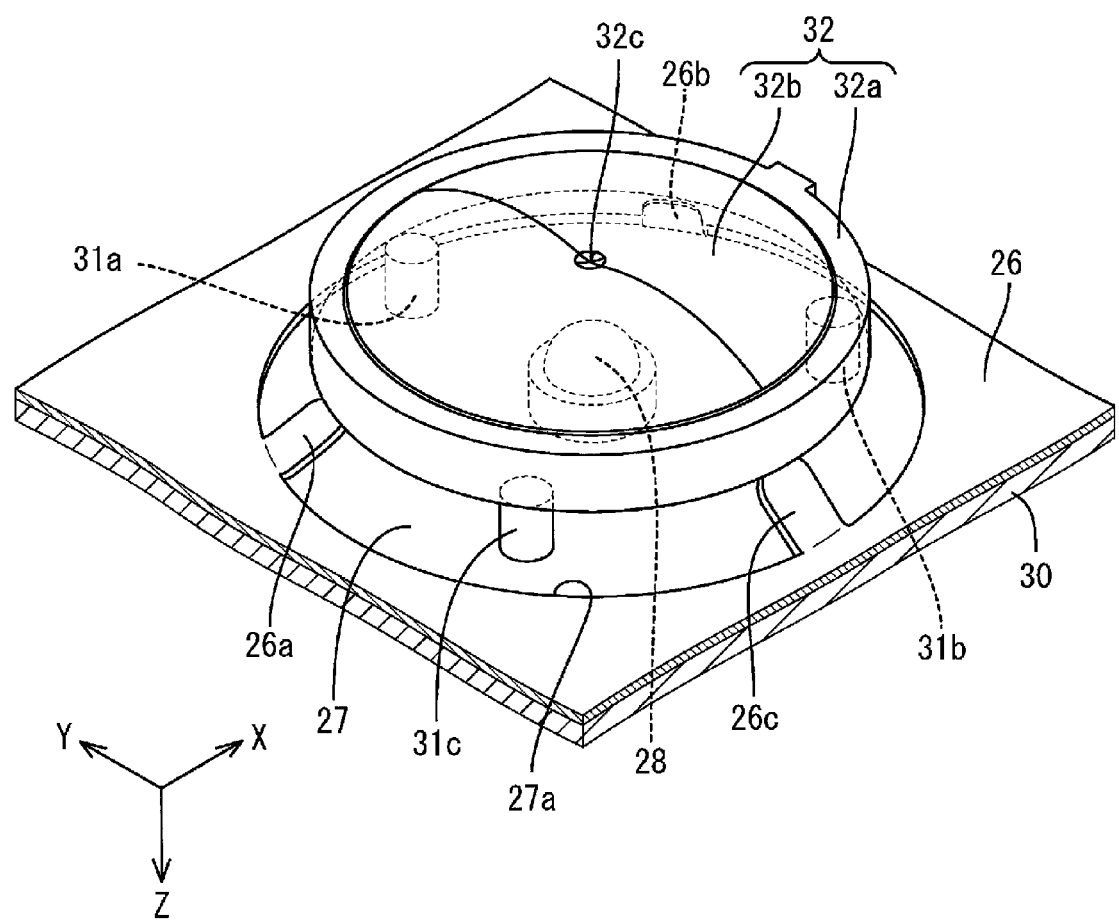
FIG. 7 is a magnified perspective view of the reflection sheet 26 and the lens 32 arranged on a front side of an LED board 30.

Next, the configurations of the lenses 32 and the reflection sheet 26 held in the backlight chassis 22 will be explained. FIG. 4 is a plan view of the lenses 32 and the reflection sheet 26 viewed from the front side. FIG. 5 is a plan view of the reflection sheet 26. FIG. 6 is a magnified cross-sectional view of the lenses 32 and the reflection sheet 26 arranged on the front side of the LED board 30 along the Y-Z plane that crosses the centers of the LEDs 28. FIG. 7 is a magnified perspective view of the LED 28 and the lens 32 arranged on the front side of the LED board 30.

As illustrated in FIGS. 4, 6 and 7, each lens 32 includes a base portion 32a and a dome portion 32b. The base portion 32a is a plate having a round plan-view shape. The dome portion 32b has a gently curved dome shape. Three legs 31a, 31b and 31c project from the rear surface of the base portion 32a in areas close to the peripheral edge of the base portion 32a. Each leg 31a, 31b or 31c has a post-like shape. The legs 31a, 31b and 31c are arranged at substantially equal intervals (about 120-degree intervals) with respect to the center of the lens 32 in plan view (see FIG. 4). The legs 31a, 31b and 31c are bonded to the surface of the LED board 30 with adhesive or thermosetting resin. The lens 32 is supported by the legs 31a, 31b and 31c on the surface of the LED board 30.

As illustrated in FIG. 6, each lens 32 has a first recess 32c at the top (opposite the diffuser plate 18a or on the light exit side). The first recess 32c has a bowl-like shape. The inner wall of the first recess 32c in a cross-sectional view has an arc-like shape. Each lens 32 has a second recess 32d in the bottom surface (on the LED 28 side). The second recess 32d is formed by denting an area directly above the LED 28 toward the front side (the upper side in FIG. 6 or toward the diffuser plate 18a) in a cone-like shape. The wall of the second recess 32d is sloped along so as to face toward the LED 28. With this configuration, the light from the LED 28 is refracted with a wide angle at a boundary between the lens 32 and air. As a result, the light is diffused around the LED 28.

As illustrated in FIGS. 4 and 5, the reflection sheet 26 has the through holes 27 at locations corresponding to the LEDs 28 and the lenses 32 when the reflection sheet 26 is place on the LED board 30. Each through hole 27 has a round shape slightly larger than the outer edge of the base portion 32a of the lens 32 so that the LED 28 and the lens 32 can be passed through.

The reflection sheet 26 includes projections 26a, 26b and 26c projecting from edges of the through holes 27 inside the through holes 27. Three projections 26a, 26b and 26c are provided in each through hole 27. The projections 26a, 26b and 26c have the same shape and the same size. The distal ends of the projections 26a, 26b and 26c are located at the same distance from the center of the lens 32 (or the first recess 32c). When the lenses 32 are passed through the respective through holes 27, the projections 26a, 26b and 26c in each through hole 27 are positioned between the legs 31a, 31b and 31c as illustrated in FIGS. 4 and 7. Specifically, the projection 26b is held between the leg 31a and the leg 31b, the projection 26c is held between the leg 31b and the leg 31c, and the projection 26a is held between the leg 31c and the leg 31a.

To place the reflection sheet 26 on the surface of the LED board 30, the reflection sheet 26 is positioned relative to the LED board 30 on which the LEDs 28 and the lenses are mounted such that the through holes 27 are aligned with the respective lenses 32. The reflection sheet 26 is positioned such that the projections 26a, 26b and 26c in each through hole 27 are located between the legs 31a, 31b and 31c of the corresponding lens 32 in plan view.

After the reflection sheet 26 is positioned, the reflection sheet 26 is lowered (toward the LED board 30) until the projections 26a, 26b and 26c in each through hole 27 are in contact with the upper outer edge surface 32a1 of the base portion 32a of the corresponding lens 32. When the reflection sheet 26 is further lowered, each lens 32 passes through the corresponding through hole 27 while the projections 26a, 26b and 26c are pushed by the side surface 32a2 of the base portion 32a of the corresponding lens 32 and bent upward (to the light exit side). When the projections 26a, 26b and 26c reach the lower end of the outer edge side surface 32a2 of the base portion 32a of the corresponding lens 32, the projections 26a, 26b and 26c slide under the lens 32 between the legs 31a, 31b and 31c due to resilience.

The distal ends of the projections 26a, 26b and 26c in each through hole 27 are in contact with the lower surface of the base portion 32a of the corresponding lens 32 and placed between the legs 31a, 31b and 31c. When the reflection sheet 26 is placed on the surface of the LED board 30, the distal ends of the projections 26a, 26b and 26c are sandwiched between the lens 32 and the LED board 30 while being in contact with the lower surface 32a3 due to friction with the lower surface 32a3 of the base portion 32a of the lens 32 (see FIG. 5). With this configuration, the movement of the projections 26a, 26b and 26a in the vertical direction (the Z-axis direction) is restricted and thus the lift of the reflection sheet 26 is effectively restricted or suppressed.

As described above, in the backlight unit 24 of this embodiment, the projections 26a, 26b and 26c of the reflection sheet 26 in each through hole 27 are held between the legs 31a, 31b and 31c. Furthermore, the projections 26a, 26b and 26c are caught between the LED board 30 and the lens 32. Therefore, the lift of the reflection sheet 26 is restricted or suppressed and thus a decrease in display performance with the backlight unit 24 is less likely to occur.

In the backlight unit 24 of this embodiment, three projections 26a, 26b and 26c are provided in each through hole 27. With the projections 26a, 26b and 26c held between the three legs 31a, 31b and 31c, the lift of the reflection sheet is effectively restricted or suppressed.

In the backlight unit 24 of this embodiment, three projections 26a, 26b and 26c have the same shape and the same size. The projections 26a, 26b and 26c are arranged at the equal intervals. Furthermore, the projections 26a, 26b and 26c are arranged such that the distal ends thereof are at an equal distance from the center of the lens 32. With this configuration, equal loads are applied to the projections 26a, 26b and 26c when the projections 26a, 26b and 26c are caught between the LED board 30 and the lens 32. Therefore, the lift of the reflection sheet 26 is effectively restricted or suppressed.

In the backlight unit 24 of this embodiment, the distal ends of the projections 26a, 26b and 26c of the reflection sheet 26 in each through hole 27 bend in an opposite direction to the LED board 30 (toward the light exit side). Furthermore, the distal ends of the projections 26a, 26b and 26c are held between the legs 31a, 31b and 31c while being in contact with the lower surface 32a3 of the base portion 32a of the lens 32. Namely, the distal ends of the projections 26a, 26b and 26c are sandwiched between the LED board 30 and the lens 32. Therefore, the lift of the reflection sheet 26 is effectively restricted or suppressed.

Second Embodiment

Figure 8:
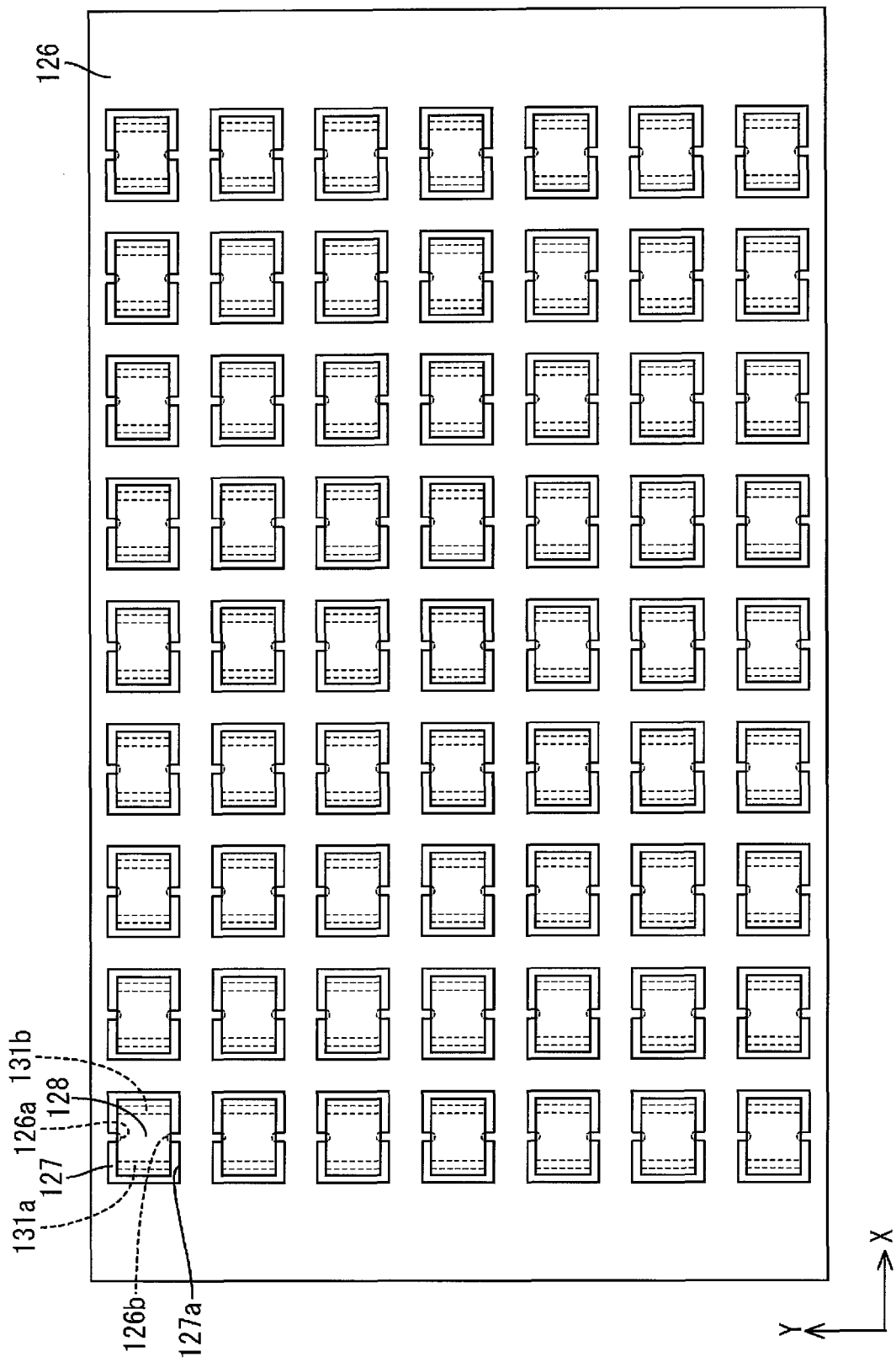
FIG. 8 is a plan view of a reflection sheet 126 and LED light sources 128 according to a second embodiment.
Figure 9:
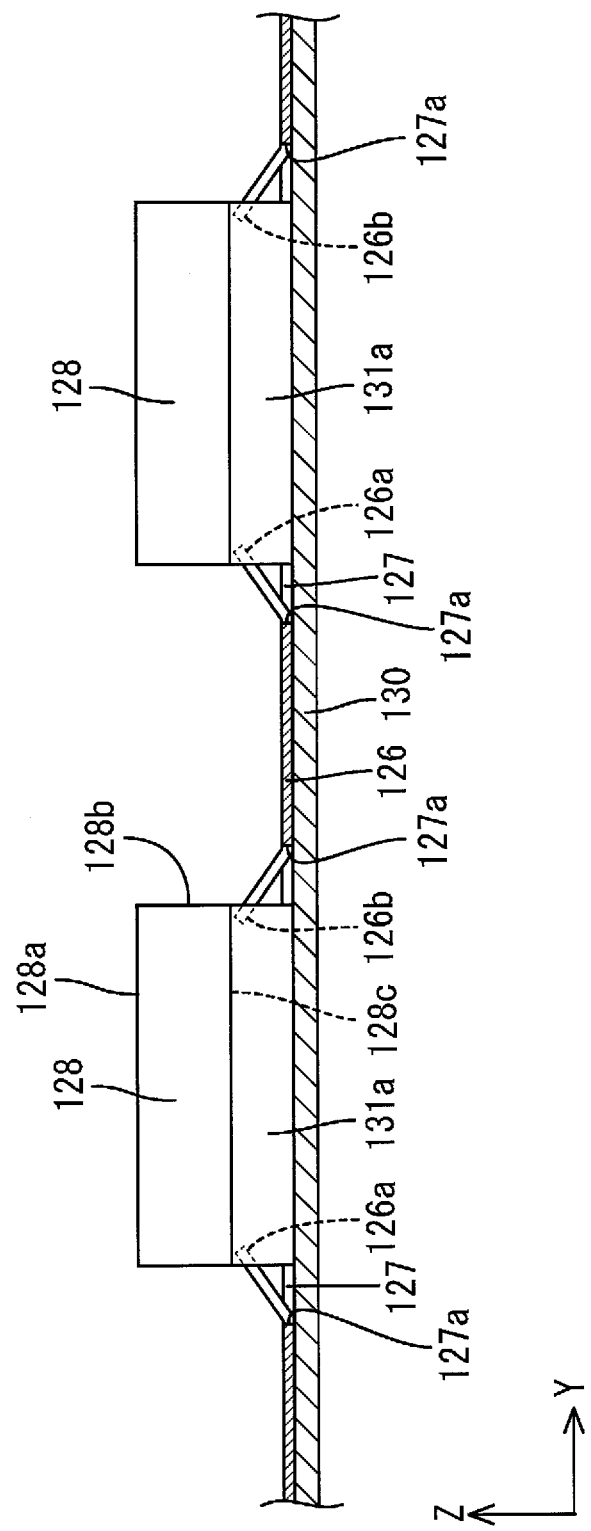
FIG. 9 is a magnified side view of the reflection sheet 126 and lenses 132 arranged on the front side of an LED board 130.

The second embodiment will be explained with reference to the drawings. FIG. 8 is a plan view of s reflection sheet 126 and LEDs 28 in the backlight unit viewed from the front side. FIG. 9 is a magnified side view of the reflection sheet 126 and lenses 132 viewed from the left side (from the left in FIG. 9). The differences between the first embodiment and the second embodiment are that the LEDs 128 are not covered with the lenses and legs extend from the LEDs 28. Other configurations are the same as the first embodiment. The same configurations, operations, and effects to those of the first embodiment will not be explained.

In the backlight unit of the second embodiment, the LEDs 128 are not covered with lenses from the light exit side and visible from the front side (or the diffuser plate side). Each LED 129 is a landscape rectangular in plan view. Legs 131a and 131b project from the rear surface of each LED 128 around the short edges of the LED 128, respectively. The legs 131a and 131b have a plate-like shape. The legs 131 and 131b are arranged such that the plate surfaces thereof are parallel to each other along the vertical direction (the Y-axis direction), and bonded to the surface of an LED plate 130. The LEDs 128 are supported by the legs 131a and 131b on the surface of the LED board 130.

The reflection sheet 126 has a plurality of through holes 127 in areas corresponding to the respective LEDs 128 when placed on the surface of the LED board 130. Each through hole 127 is rectangular slightly larger than an outer size of the corresponding LED 128 such that the LED 128 can be passed therethrough.

Two projections 126a and 126b project inward from respective edges of each through hole 127 of the reflection sheet 126. The projections 126a and 126b have the same shape and the same size. The projections 126a and 126b are located at the long edges 127a, respectively. When the LEDs 128 are passed through the respective through holes 127, the projections 126a and 126b in each through hole are positioned between the legs 131a and 131b of the corresponding LED 128.

To place the reflection sheet 126 on the surface of the LED board 130, the reflection sheet 126 is positioned relative to the LED board 130 on which the LEDs 128 are mounted such that the through holes 127 are aligned with the respective LEDs 128, in the similar manner to the first embodiment. The reflection sheet 126 is positioned such that the projections 126a and 126b in each through hole 127 are located between the legs 131a and 131b of the corresponding lens 132 in plan view.

After the reflection sheet 126 is positioned, the reflection sheet 126 is lowered, each LED 128 passes through the corresponding through hole 127 while the projections 126a and 126b are pushed by the side surface 128a of the LED 128 and bend upward with the edges 127a as base lines. When the projections 126a and 126b reach the lower end of the side surfaces 128a of the LED 128, the projections 126a and 126b are placed between the legs 131a and 131b.

The distal ends of the projections 131a and 131b are in contact with the lower surface 128 of the LED 128 when the projections 131a and 131b slide between the legs 131a and 131b. When the reflection sheet 126 is placed on the surface of the LED board 130, the distal ends of the projections 126a and 126b are sandwiched between the LED 128 and the LED board 30 while being in contact with the lower surface 128c due to friction with the lower surface 128c (see FIG. 9). With this configuration, the movement of the projections 126a and 126b in the vertical direction (the Z-axis direction) is restricted and thus the lift of the reflection sheet 126 is effectively restricted or suppressed.

As described above, in the backlight unit 24 of this embodiment, the projections 126a and 126b of the reflection sheet 126 in each through hole 127 are held between the legs 31a and 31b. Furthermore, the projections 126a and 126b are caught between the LED board 130 and the LED 128. Therefore, the lift of the reflection sheet 126 is effectively restricted or suppressed.

In the backlight unit of the second embodiment, the distal ends of the projections 126a and 126b in each through hole 127 of the reflection sheet 126 are bent toward the opposite direction to the LED board 130 (i.e., toward the light exit side). Further more, the distal ends of the projections 126a and 126b are held between the legs 31a and 31b while being in contact with the LED 128. Namely, the distal ends of the projections 126a and 126b are sandwiched between the LED board 130 and the LED 128. Therefore, the lift of the reflection sheet 126 is effectively restricted or suppressed.

The components of the above embodiments may be described as follows. The LED board 30 or 130 may correspond to a light source board. The LEDs 28 or 128 may correspond to a light source. The legs 31a, 31b, 31c, 131a or 131b may correspond to a support member. The backlight chassis 22 may correspond to a housing. The backlight unit 24 or 124 may correspond to a lighting device.

Modifications of the above embodiments will be described below.

(1) In the above embodiments, the distal ends of the projections are held between the legs while being bent. However, the distal ends may not be bent but held between the legs. In this case, a reflection sheet may be placed on a surface of an LED board before the LEDs and the lenses are mounted. The height of the legs may be defined equal to the thickness of the reflection sheet. With this configuration, the projections can be sandwiched between the LED board and the LEDs or the lenses.

(2) In the above embodiments, the distal ends of the projections are sandwiched between the LED board and the LEDs or the lenses. However, the distal ends of the projections may not be sandwiched between the LED board and the LEDs or the lenses. In this case, the distal ends of the projections may be in contact with the lower surfaces of the LEDs or the lenses if the reflection sheet is slightly lifted. Therefore, the reflection sheet is hardly or less likely to be further lifted.

(3) In the above embodiments, no spacers are provided on the surface of the LED board. However, spacers may be arranged on the surface of the LED board and passed through the through holes to maintain a gap between the LED board and the diffuser plate.

(4) The arrangements, the configurations, and the numbers of the legs and the projections can be altered as appropriate.

(5) In the above embodiments, the liquid crystal display device including the liquid crystal panel as the display panel is used. However, the aspect of the present invention can be applied to display devices including other types of display panels.

(6) In the above embodiments, the television device including the tuner is used. However, the aspect of the present invention can be applied to display devices without tuners.

The embodiments have been described in detail. However, the above embodiments are only some examples and do not limit the scope of the claimed invention. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: Television device, Ca, Cb: Cabinet, T: Tuner, S: Stand, 10: Liquid crystal display device, 12: Bezel, 14: Frame, 16: Liquid crystal panel, 18: Optical member, 18a: Diffuser plate, 18b: Optical sheet, 20: Outer edge member, 22: Backlight chassis, 22a: Bottom plate, 22b: Long edge portion, 22c: Short edge portion, 22d: Fixing hole, 24: Backlight unit, 25: Power supply circuit board, 26, 126: Reflection sheet, 26a, 26b, 26c, 126a, 126b: Projection, 27, 127: Through hole, 28, 128: LED, 30, 130: LED board, 31a, 31b, 31c, 131c, 131a, 131b: Leg, 32: Lens, 32a: Base portion, 32b: Dome portion, 32c: First recess, 32d: Second recess, 40: Light reflector

The invention claimed is:

1. A lighting device comprising:
a light source board;
a light source arranged on a first main surface of the light source board;
a lens configured to diffuse light from the light source, the lens covering the light source from a light exit side;
a plurality of support members supporting the lens, the support members being arranged on the first main surface of the light source board;
a reflection sheet having a through hole, the reflection sheet being arranged on the first main surface of the light source board; and
a housing having a bottom plate opposed to a second main surface of the light source board, the housing holding the light source board, the light source, the lens, the supporting members, and the reflection sheet therein, wherein
the light source and the support members are passed through the through hole of the reflection sheet,
the reflection sheet includes a projection projecting inward from an edge of the through hole, and
the projection is held between the support members.

2. A lighting device comprising:
a light source board;
a light source arranged on a first main surface of the light source board;
a plurality of support members supporting the light source, the support members being arranged on the first main surface of the light source board;
a reflection sheet having a through hole, the reflection sheet being arranged on the first main surface of the light source board; and
a housing having a bottom plate opposed to a second main surface of the light source board, the housing holding the light source board, the light source, the supporting members, and the reflection sheet therein, wherein
the light source and the support members are passed through the through hole of the reflection sheet,
the reflection sheet includes a projection projecting inward from an edge of the through hole, and
the projection is held between the support members.

3. The lighting device according to claim 1, wherein the projection includes a plurality of projections in the through hole.

4. The lighting device according to claim 3, wherein the projections have a same shape and a same size.

5. The lighting device according to claim 3, wherein the projections are arranged at equal intervals.

6. The lighting device according to claim 3, wherein the projections are arranged such that distal ends thereof are at an equal distance from a center of the lens or the light source.

7. The lighting device according to claim 1, wherein a distal end of the projection is bent toward an opposite direction to the light source board and held between the support members while being in contact with the lens or the light source.

8. A display device comprising:
the lighting device according to claim 1; and
a display panel configured to provide display using light from the lighting device.

9. The display device according to claim 8, wherein the display panel is a liquid crystal display including liquid crystals.

10. A television device comprising the display device according to claim 8.

* * * * *